United States Patent [19]
Mattia et al.

[11] 3,760,069
[45] Sept. 18, 1973

[54] PROCESS FOR PRODUCING FERROUS SULFATE
[75] Inventors: Francis Joseph Mattia, Brooklyn; Stephen Allen Sakler, Bronx, both of N.Y.
[73] Assignee: M & T Chemicals Inc., New York, N.Y.
[22] Filed: May 7, 1971
[21] Appl. No.: 141,350

Related U.S. Application Data
[63] Continuation of Ser. No. 815,189, April 10, 1969, abandoned.

[52] U.S. Cl. ............................................. 423/558
[51] Int. Cl. ............................................. C01g 49/14
[58] Field of Search ..................... 23/126, 172, 200; 134/10, 13; 423/146, 558

[56] References Cited
UNITED STATES PATENTS

| | | | |
|---|---|---|---|
| 2,662,812 | 12/1953 | Shaw | 23/126 |
| 1,626,623 | 5/1927 | Morgan | 134/13 |
| 3,018,166 | 1/1962 | Powell | 23/126 |
| 2,045,625 | 6/1936 | White | 23/126 |
| 2,332,647 | 10/1943 | Keyes | 23/126 |
| 2,668,130 | 2/1954 | Martin | 134/13 |
| 2,189,419 | 12/1939 | Fowler | 23/126 |
| 2,017,773 | 10/1935 | Smith | 23/126 |

OTHER PUBLICATIONS
"Chemical Engineering"; August, 1957, pp. 168 & 170.
Pearson, J. et al.; "Journal of the Icon and Steel Institute" (London); April, 1951; pp. 439–445.

Primary Examiner—G. O. Peters
Attorney—Robert Spector, Lewis C. Brown, Kenneth G. Wheeless and Robert P. Grindle

[57] ABSTRACT
A process is provided for converting iron, such as scrap iron, directly to ferrous sulfate monohydrate in the absence of intermediate formation of ferrous sulfate heptahydrate, the use of pressure, vacuum and/or excessively high operating temperatures. The above is achieved by reacting iron and a sulfuric acid solution having a concentration within the range of between about 10–90 percent for a period of time sufficient to reduce the free acid concentration to between about 2–35 percent, separating the resulting solution from the unreacted iron, filtering the solution to remove any precipitation and impurities contained therein, adding concentrated sulfuric acid to the solution to bring the free sulfuric acid concentration up to between about 35–45 percent for precipitating pure ferrous sulfate monohydrate and separating the pure ferrous sulfate monohydrate precipitate from the filtrate.

1 Claim, No Drawings

PROCESS FOR PRODUCING FERROUS SULFATE

This application is a continuation of application Ser. No. 815,189 filed Apr. 10, 1969 and now abandoned.

Generally speaking, this invention relates to a process for the production of ferrous sulfate from scrap iron. More particularly, this invention relates to the production of ferrous sulfate monohydrate from scrap iron in the absence of the intermediate formation of ferrous sulfate heptahydrate.

As is well known, ferrous sulfate is particularly useful as a starting material in the manufacture of pure iron oxide which, in turn, is useful in the manufacture of ferrites. When it is realized that only slightly more than 61 lbs. of ferrous sulfate monohydrate yields the same quantity of ferrous sulfate as 100 lbs. of ferrous sulfate heptahydrate, the economic advantages of using the monohydrate form for the production of iron oxide become obvious, even if one is only considering the difference in handling weight involved. The difference, of course, as well known, is in the water content of the heptahydrate form of ferrous sulfate which must be driven off so as to provide a satisfactory economical ingredient for the production of pure iron oxide.

Other advantages of the monohydrate form of ferrous sulfate over the heptahydrate form include the fact that it is more readily calcined to form iron oxide and it does not fuse nearly as readily when heated as does the heptahydrate. In addition, when stored, it is much more stable and does not rapidly oxidize in air or absorb moisture as does the heptahydrate form. In the past, attempts have been made to produce ferrous sulfate from iron by dissolving the iron in sulfuric acid. However, such a reaction produces the more undesirable heptahydrate form of ferrous sulfate, as well known. Attempts have been made to overcome this problem, particularly in processes for recovering iron salts from waste pickle liquors. However, such processes are directed to different problems than those related to the production of the monohydrate from scrpa iron in that such processes involve solutions which must be handled in a manner so as to remove the iron salts therefrom and include the application of elevated temperatures or pressures or a combination of the two for producing an intermediate monohydrate product from such pickle liquor solutions.

Thus, the problem arises where in order to produce ferrous sulfate directly from iron, such as steel scrap, one obtains the undesirable ferrous sulfate heptahydrate which from an economic standpoint creates certain problems in its use in the production of further products therefrom, and conversely, if it is attempted to produce the more desirable final product of the ferrous sulfate monohydrate, uneconomical processes such as utilization of expensive evaporation and/or high pressure techniques must be used in order to control the reaction for the recovery thereof from spent pickle liquors, for example, for the production of the more desirable monohydrate form, which, in turn, makes it more expensive for use in further processes.

By contrast, and quite unexpectedly, it has now been found in accordance with this invention that by combining iron, such as steel scrap, with a sulfuric acid solution at a concentration of between about 10–90 percent for a period of time to reduce the acid concentration to a particular level, separating any precipitate and/or impurities contained therein from the acid solution of reduced concentration, and thereafter adding concentrated sulfuric acid in an amount sufficient to increase the free acid concentration to within a particular range, a ferrous sulfate monohydrate precipitate is formed which is readily separated from the reacting environment and under conditions requiring no pressure and very little temperature. The reaction takes place with little or no control necessary and the end product is separated after a period of time with the only requirement being that the reaction be allowed to go to completion at a particular level of free acid concentration.

The resulting precipitate is readily separated from the reacting solution by filtration and if a batch-type procedure is used, as described in more detail below, any unreacted iron in the filter cake is easily separated therefrom magnetically. As is obvious with such an arrangement, little attention must be given to the reactants during the reaction period thus reducing substantially the cost simply because no temperature and/or pressure controls must be utilized to any appreciable extent for maintaining control during the reaction period. It has been found, in accordance herewith, that a substantially pure form of ferrous sulfate monohydrate is achieved.

In addition, the process in accordance herewith, is readily applicable to a continuous procedure in which sulfuric acid and iron are reacted, with the sulfuric acid being at a particular range of concentration and with the sulfuric acid being continuously circulated through a container of scrap iron. This continuous procedure continues until the free acid concentration is reduced to a particular level at which time the acid solution is drawn off and filtered to separate out any impurities and/or precipitate. To the filtrate is added concentrated sulfuric acid to bring the free sulfuric acid concentration up to a particular range of concentration at which point the pure ferrous sulfate monohydrate is precipitated. The product is thereafter filtered off and the filtrate is recirculated back through the scrap iron container where additional amounts of iron scrap are added continuously to maintain the initial reacting conditions.

Accordingly, it is one object of this invention to produce ferrous sulfate monohydrate from iron, such as iron scrap, In addition, it is another object of this invention to produce such ferrous sulfate monohydrate in substantially pure form and in the absence of the production of the intermediate ferrous sulfate heptahydrate.

It is a further object of this invention to produce such ferrous sulfate monohydrate by the reaction of the iron with sulfuric acid which reaction requires little or no control during the reaction period. A further object of this invention is a process for the production of ferrous sulfate monohydrate directly from scrap iron in the absence of any pressure requirements and at only slightly elevated temperatures and requiring no expensive evaporative and/or calcining procedures. In addition, it is an object of this invention to produce substantially pure ferrous sulfate monohydrate which is readily separable from the reaction environment, and which product in turn is readily separable from any unreacted iron from the reaction of the process.

With the foregoing and additional objects in view, this invention will be described in more detail and other objects and advantages will be apparent from the following description and the appended claims.

Before describing this invention in more detail, it may be well to note that this invention has been found applicable to a wide variety of iron sources, such as, for example, scrap iron left over from detinning operations, which operations are usually applicable to discarded tin scrap in which the relatively valuable tin plate has been separated from the steel thereof, as well known. For example, satisfactory results have been achieved in accordance herewith, and under satisfactorily and economically attractive conditions in commercial scale operations with ferrous scrap resulting from detinning operations with the ferrous scrap being added to the reaction zone along with a sulfuric acid solution in a concentration of between about 10–90 percent, and maintaining the admixture at a temperature between about ambient to 100°C. for a period of time sufficient to reduce the free acid concentration down to between about 2–35 percent, separating the resulting solution from the unreacted iron, filtering the solution to remove any precipitation and impurities contained therein, adding concentrated sulfuric acid to the solution to bring the free acid concentration up to between about 35–45 percent for precipitating pure ferrous sulfate monohydrate, and separating the pure ferrous sulfate monohydrate from the filtrate.

In addition, the reaction environment requires no application of pressure and/or vacuum procedures in order to provide satisfactory results, in accordance herewith. The reaction produces a ferrous sulfate monohydrate substantially with no control thereof and the precipitated ferrous sulfate monohydrate is readily separated from the reaction zone, and in certain instances the resulting separated precipitate may be separated from any unreacted ferrous scrap merely by application of magnetic means.

In considering generally the conditions for achieving the enhanced results in connection herewith, which conditions are more specifically set forth below, one may note that satisfactory ferrous sulfate monohydrate product may be produced in accordance herewith in cyclic operations in which after the precipitate product has been separated from the acid solution, and any unreacted iron separated from the precipitate product if a batch-type procedure is used, additional quantities of iron and sulfuric acid may be introduced into the reaction zone for the production of additional amounts of ferrous sulfate monohydrate, with care being taken only to maintaining the free sulfuric acid concentrations in the reaction zones within the ranges noted above.

A preferred cycle of operation in accordance herewith for producing the ferrous sulfate monohydrate product includes admixing iron, such as scrap produced by detinning operations, and sulfuric acid in a reaction zone having between about 10–90 percent free sulfuric acid concentration, and preferably 40% $H_2SO_4$. The temperature of the admixture is maintained between ambient and 100°C., and preferably 50°C. The reactin zone is maintained as above for the period of time necessary to reduce the free acid concentration down to the range of between about 2–35 percent for the reaction to come to completion, and preferably about 20–30 percent, and thereafter, any precipitates and impurities are separated from the solution. Then concentrated sulfuric acid is added to the solution to bring the free acid concentration up to between about 35–45 percent, preferably 40 percent, to precipitate out the pure ferrous sulfate monohydrate product. The precipitate is separated from the acid solution, preferably by centrifuge, to obtain a substantially pure ferrous sulfate monohydrate product and the remaining filtrate is recycled to the first reaction zone for further reaction with additional quantities of iron.

As noted above, the process in accordance herewith achieves the desired pure ferrous sulfate monohydrate directly from a reaction of iron and sulfuric acid in the absence of the production of any of the undesirable intermediate ferrous sulfate heptahydrate, and with little or no control being necessary for the reaction environment, thus eliminating expensive evaporative, pressure and/or vacuum application procedures. Further, the ferrous sulfate monohydrate has a much larger quantity of the desired ferrous sulfate on a weight for weight basis and is readily stored for long periods of time without requiring provisions for preventing oxidation and/or water absorption thereof.

As purely illustrative of the results achieved by the process, in accordance herewith, examples were prepared using the preferred ratio of reactants, in accordance herewith, and under the preferred control conditions for the reaction zone. It is to be understood, however, that these examples are being presented with the understanding that they are to have no limiting character on the broad disclosure of the invention as generally set forth herein and as directed to men skilled in the art.

EXAMPLE 1

In this test, a procedure was used in order to provide an indication of the manner in which the process, in accordance herewith, can be operated in a continuous manner.

A 40% $H_2SO_4$ solution, heated to 50°C. was circulated through a glass column filled with steel scrap. The size of the column and the quantity of iron may vary, with the only necessary parameter being that the quantity of iron be sufficient to maintain the reaction and that the acid concentration be within the ranges taught, in accordance herewith.

When the concentration of the circulated acid solution had dropped to 30 percent, the circulated solution was drawn off, and filtered. The filter cake contained carbon and some ferrous sulfate monohydrate. To the filtrate derived from this filtration was added sufficient concentrated sulfuric acid to bring the free acid concentration back up to 40 percent, at which point the ferrous sulfate monohydrate precipitated out and was separated from the acid solution by additional filtration. Tests showed the filter cake to be the pure ferrous sulfate monohydrate. The filtrate from this additional filtration was recycled through the glass column for another cycle with the addition of more scrap and acid to maintain the acid concentrations noted above.

EXAMPLE 2

In this example, a pilot plant run was made in which a glass column, as well known, was used. 8.5 lbs. of steel scrap was inserted in the column, and 34 gallons of a 40% $H_2SO_4$ solution was circulated at 50°C. through the column. Circulation was stopped when the free acid in the solution had dropped to 30 percent. During this time, 12 lbs. additional scrap was added to the column to maintain scrap level. The 30 percent solution was filtered and yielded, along with impurities such as carbon, 5.5 lbs. of $FeSO_4 \cdot H_2O$. The clear filtrate was brought back to a 40 percent free acid concentration by the addition of 60 lbs. of concentrated $H_2SO_4$. At this point, $FeSO_4 \cdot H_2O$ was precipitated out and was removed by filtration. The yield was 23 lbs. of pure $FeSO_4 \cdot H_2O$. The filtrate was then recycled through the scrap-containing column for another cycle with the addition of further sulfuric acid, when needed, in order to maintain the free acid concentration levels noted above.

Although in these examples circulation through the scrap-containing column was stopped between each cycle, it is to be understood that it is well within the purview of this invention, that the acid solution at 30 percent concentration, would be drawn off, and additional acid at 40 percent concentration be added to the stream circulating through the scrap column in order to maintain a continuous operation. In this manner, the filtration and additional precipitation procedures would be carried out in a separate flow pattern from the main circulation stream of acid solution running through the scrap.

In addition, the filter cake resulting from the first filtration containing an impure $FeSO_4 \cdot H_2O$ may be added to the system and recirculated. As an alternative, the impure product may be utilized for certain purposes where the presence of the impurities are not detrimental to that use.

Accordingly, and as will be apparent from the foregoing, there is provided in accordance herewith, a method for producing pure ferrous sulfate monohydrate directly from the reaction of iron and sulfuric acid in the absence of any production of the undesirable intermediate ferrous sulfate heptahydrate. In addition, the process, in accordance herewith, requires no continuous or expensive controls other than the application of slightly elevated temperature, as desired, and with the absence of any requirement for the application of expensive control procedures and/or separation procedures including evaporation, pressure and/or vacuum application.

In addition, the product obtained from the process taught, in accordance herewith, is easily separated from the reaction environment, with the product, in turn, being readily separable from any unreacted portions of the reactants. Thus, the products obtained by the process, in accordance herewith, are substantially less than the cost of products obtained by the previous methods taught in the art, thus making the resulting product and the formulations in accordance herewith highly advantageous commercially.

While the methods and compositions herein disclosed form preferred embodiments of this invention, this invention is not limited to those specific methods and compositions, and changes can be made therein without departing from the scope of this invention which is defined in the appended claims.

What is claimed is:

1. A process for producing ferrous sulfate monohydrate directly from iron in the absence of the production of the intermediate ferrous sulfate heptahydrate, the steps of said process comprising:
   a. admixing in a reaction zone quantites of iron and sulfuric acid, the sulfuric acid concentration being about 40 percent, maintaining said reaction zone at ambient pressure and at a temperature of between about ambient to 100°C.;
   b. reacting said quantites of iron and said sulfuric acid in the absence of further acid additions to said zone until the free acid concentration level drops to within the range of between about 20–30 percent to form a first acid solution;
   c. removing the resulting first acid solution from said reaction zone and separating in a first separating step any solid impurities contained therein from said first solution;
   d. adding concentrated sulfuric acid to said first solution to form a second acid solution and in an amount sufficient to raise the free acid concentration to within the range of between about 35–45 percent for precipitating out pure ferrous sulfate monohydrate product;
   e. separating in a second separating step said product from said second solution;
   f. recycling said second acid solution after said second separating step to said reaction zone, and adding further additional quantities of sulfuric acid to said reaction zone to achieve an acid concentration of about 40 percent for the purpose of producing an additional quantity of precipitated ferrous sulfate monohydrate; and
   g. adding the precipitate from said first separating step to said recycled second acid solution.

* * * * *